Patented Oct. 22, 1935

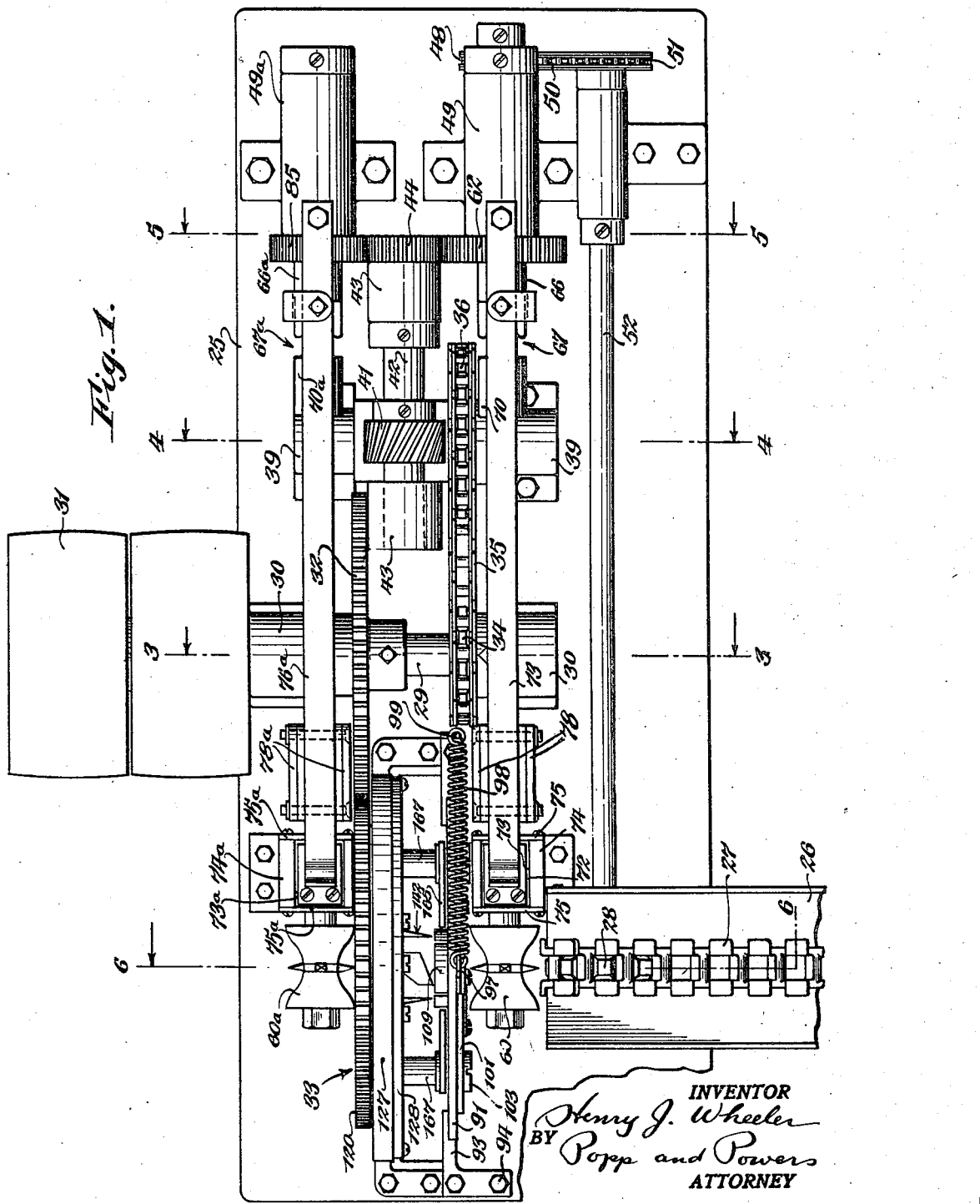

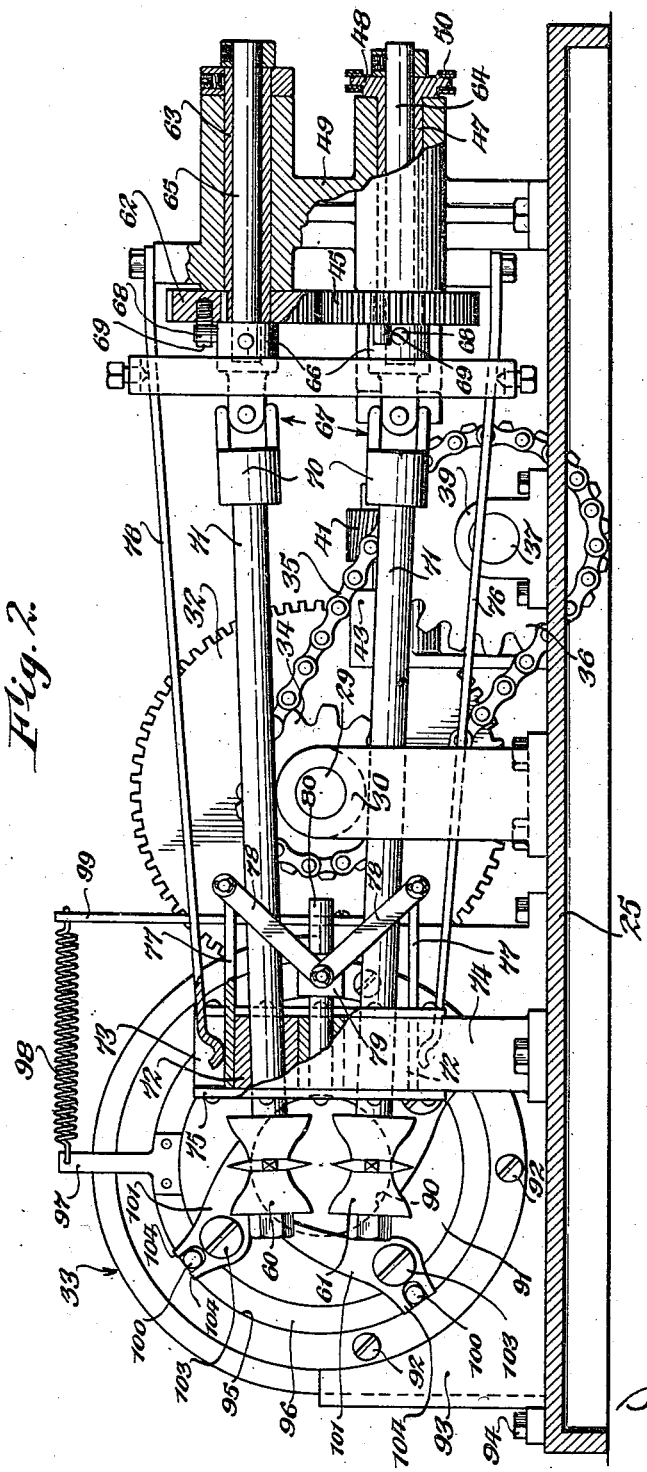

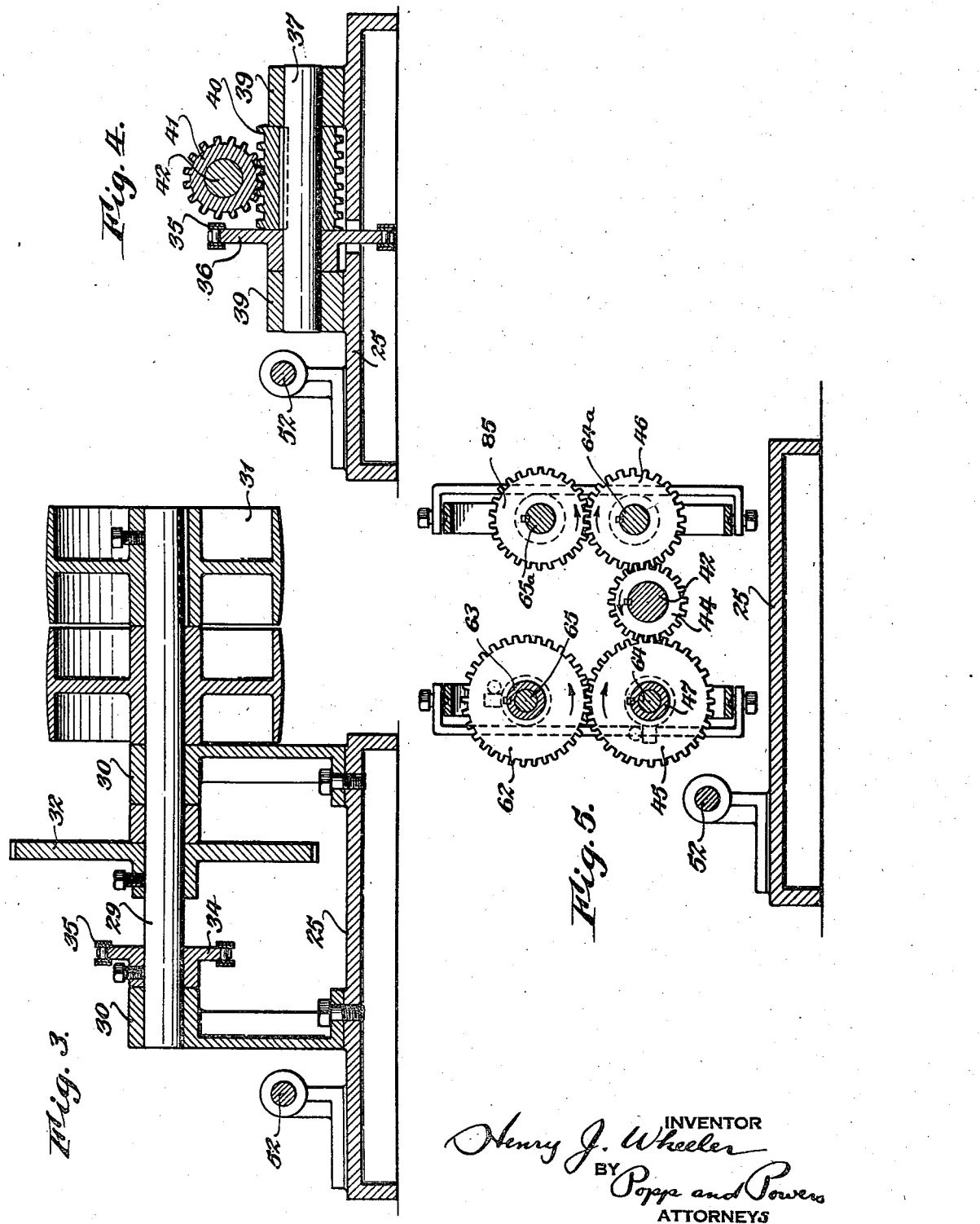

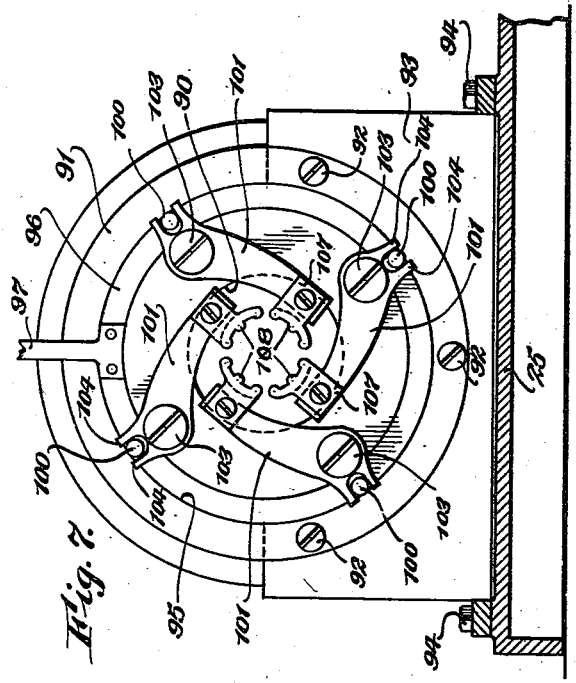

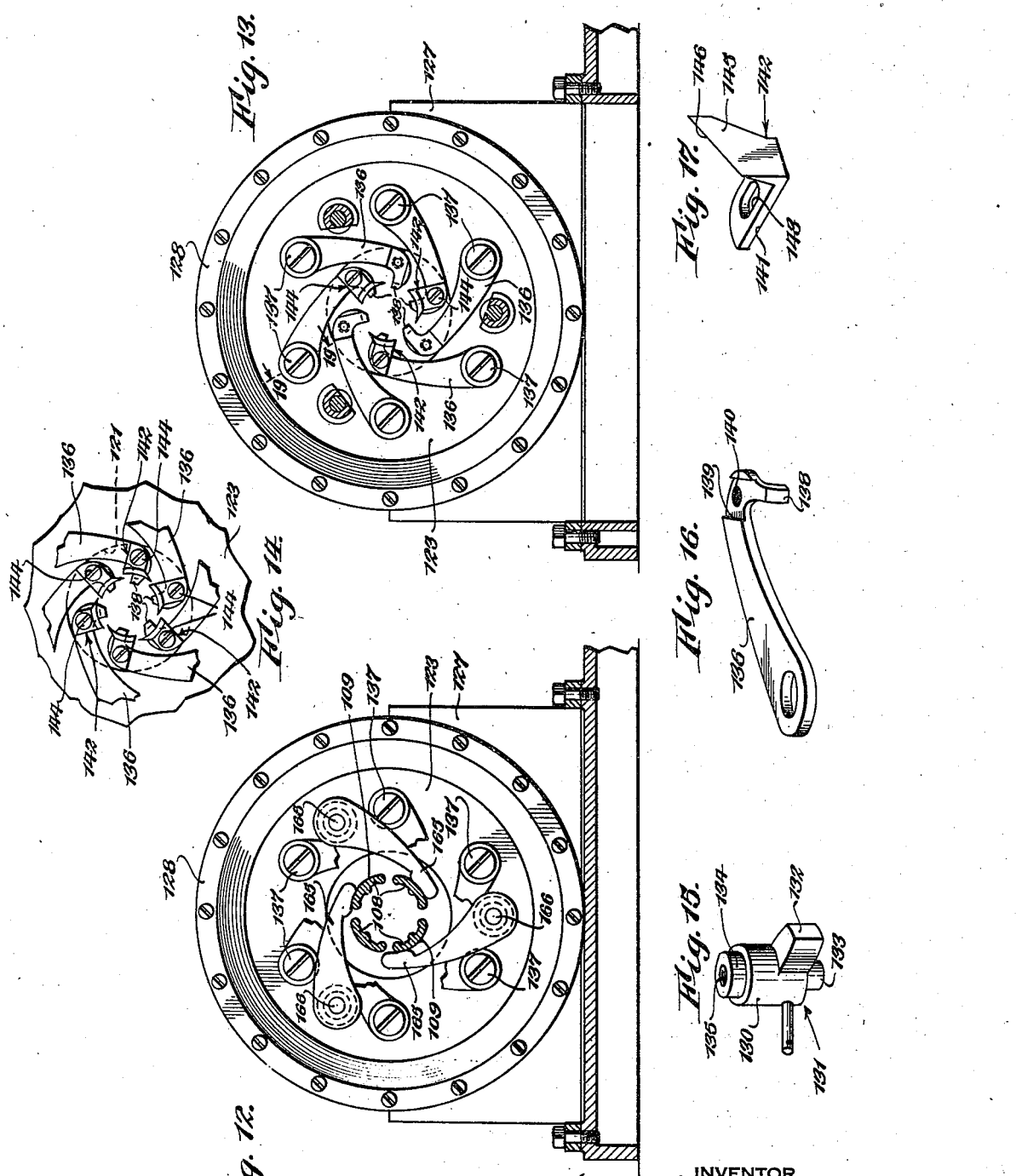

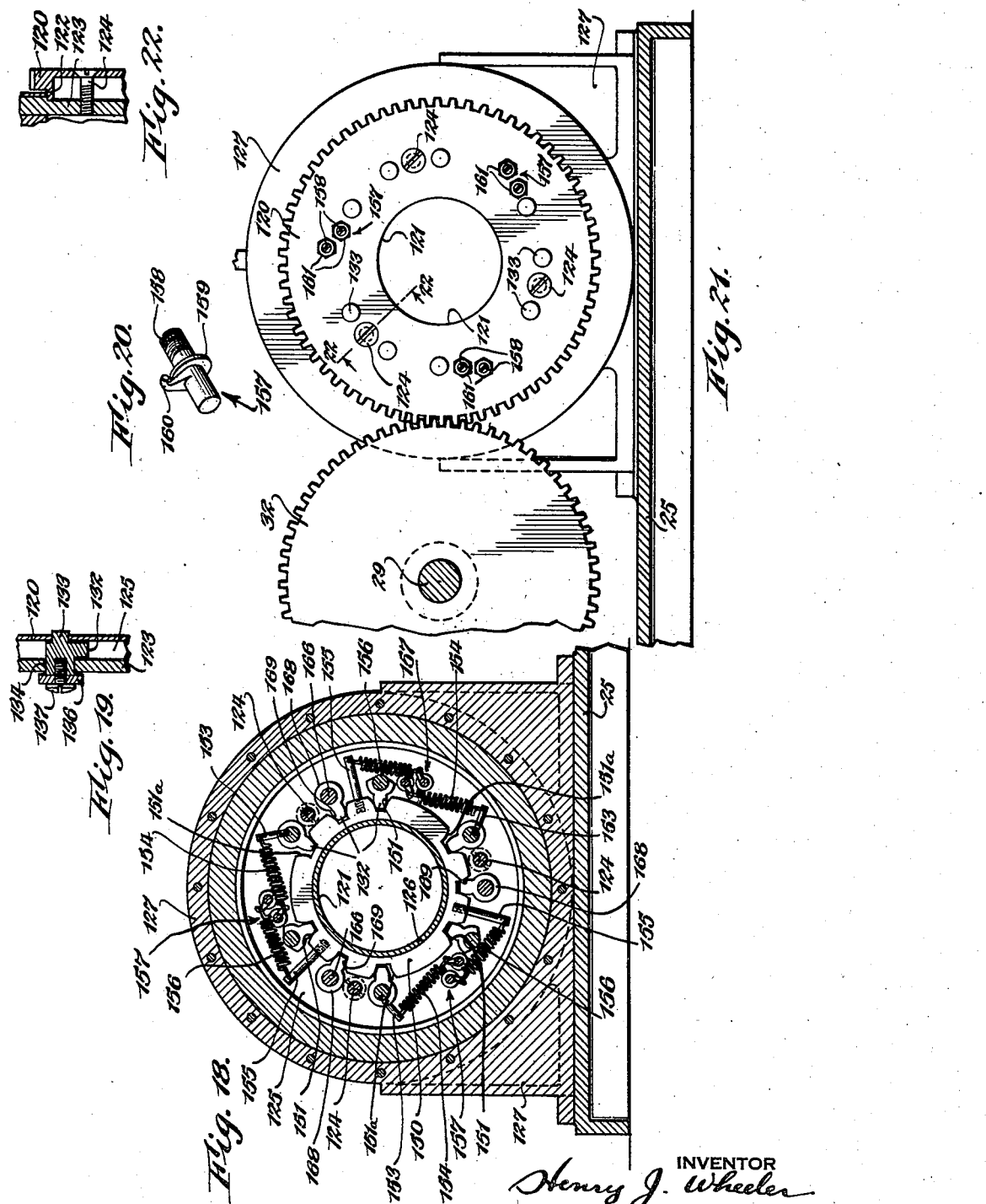

2,017,931

UNITED STATES PATENT OFFICE 2,017,931

CORN CUTTER

Henry J. Wheeler, Buffalo, N. Y.

Application November 19, 1932, Serial No. 643,360

18 Claims. (Cl. 130—9)

This invention relates to a rotary corn cutter, and more particularly to a rotary type of corn cutter in which, if the corn is sufficiently matured, the caps of the kernels are cut off from the ear and the soft inside parts of the kernels then scraped, and which, if the corn is immature or of unusually small kernels, the milk from these kernels is scraped without cutting. The product therefore comprises the caps of the kernels and the creamy inside portions of the kernels, this product being generally known as "cream style corn". The invention also comprehends slitting the kernels so as to cut the severed cap in two and also comprehends taking one or more slices from the kernel, in addition to its cap, when the kernels of the cob are unusually large.

One of the objects of this invention is to provide a rotary cream style corn cutter. Different types of cream style corn cutters have heretofore been proposed but no satisfactory rotary type has been provided. In a rotary type, ears of corn to be decapped and scraped are fed through a rotary head which carries the gaging, cutting and scraping means by which the cream style corn is produced. This type of machine is extremely compact and can be operated at a very high rate of speed. The difficulties heretofore encountered in alining, gaging, cutting, scraping and conveying ears of corn in such rotary machines have rendered this type of machine unsuitable for producing cream style corn.

Another object of the present invention is to provide means for accurately alining the ear of corn to be operated on in a position coaxial with the rotary head so that the ears feed into the rotary head smoothly and are always in proper position for the succeeding operations of cutting and scraping the kernels.

Another object is to provide means arranged immediately in advance of the rotary knives for opening up the knives in accordance with the diameter of the ear and to provide spring means for restoring the opening up means and knives to a normal closed position as the ears successively pass. This means is so designed and the operative connection between this means and the knives so adjusted that the knives are opened up only far enough to receive the ear and are thereafter opened up the remaining distance by the scrapers associated with the knives. By this means the depth of the cut is determined by the scrapers and the means for initially opening up the knives are rendered inoperative, thereby reducing wear and noise in the opening up means since this means is preferably mounted on a stationary part of the machine whereas the knives and scrapers are, of course, mounted on a rotary head.

Another aim is to provide a rotary cutter head in which the depth of the cut is gaged from the cob of the ear. By this means the knives are at all times prevented from cutting into the cob and in the event that the ears are immature the caps of the kernels will not be cut at all but the milk will be squeezed from these kernels by the scrapers.

A further purpose is to provide a rotary cutter in which the knives can be adjusted to take two or more slices from the kernels. By this means if the kernels are unusually large, instead of cutting one large cap portion from each kernel, this cap portion is taken off in two slices so that the resulting product is substantially the same as cream style corn from smaller and less matured ears. The invention also comprehends providing slicing knives at the feed end of the rotary cutter which slit the kernels of large and matured kerneled corn lengthwise of the ear so that the caps are also cut in half as well as being cut away from the kernel in slices by the rotary knives.

A further object is to provide a rotary head which carries both cutter elements and scraper elements and in which all of the cutter elements are connected so as to move toward and from the axis of the travel of the ear uniformly. The scrapers are also caused to so move in unison but special provision is made to provide a limited play for these scrapers whereby they can follow irregularities in the corn cob and extract all of the inner parts of the kernels regardless of irregularities in the formation of the cob.

A further object of the present invention is to provide for the ready removal and replacement of the rotary knives and other wearing parts by rendering the support for the means which open up these knives readily removable and thereby exposing these knives for adjustment or replacement as they become worn. A further purpose is to render the operating heads of the knives and scrapers interchangeable thereby reducing the number of special parts and standardizing them.

A further object is to provide feed and discharge spur wheels to and from the rotary head in such closely spaced relation that both engage the ear of corn being operated upon at the same time and to drive the discharge spur wheels faster than the feed spur wheels and to provide a lost motion between these wheels so that the ear of corn being operated upon is definitely discharged from the machine before the feeding of the next succeeding ear of corn is started. By this means all parts of the mechanism are afforded an opportunity to return to their initial position before each succeeding ear of corn is presented to the rotary cutter head.

A further object is to render all parts of the machine readily and conveniently adjustable, particularly in respect of the tension of the springs which retract the knives and scrapers carried by the rotary head, the tension of these springs requiring adjustment in accordance with the centrifugal forces imposed upon the scraper and cutter fingers.

Further objects are to provide such a machine which consists of comparatively few parts, considering the function which it performs; which is sturdy, durable, easily kept in a clean and sanitary condition; and will operate efficiently for a long period of time without requiring repair or replacements.

In the accompanying drawings:

Fig. 1 is a fragmentary, top plan view of a rotary cream style corn cutter embodying my invention.

Fig. 2 is a side elevation, partly in section, of the same.

Figs. 3, 4, 5 and 6 are vertical, transverse sections taken on the correspondingly numbered lines on Fig. 1.

Fig. 7 is a vertical section taken on line 7—7, Fig. 6 and showing a front elevation of the means for opening up the cutters and scrapers in accordance with the size of the ear about to be operated upon.

Fig. 8 is a perspective view of one of the fingers shown in Fig. 7 and which form part of the mechanism for opening up the cutters and scrapers.

Fig. 9 is a perspective view of a type of head adapted to be attached to the finger shown in Fig. 8, this head forming the element which engages the ear of corn being presented to the rotary cutter.

Fig. 10 is a fragmentary elevation similar to Fig. 7 and showing a modified form of heads which engage the ears of corn and form part of the means for opening up the rotary cutters and scrapers in accordance with the size of the ear.

Fig. 11 shows a perspective view of this form of head in which cutting blades are provided for slitting the kernels radially when large kerneled, matured ears are being operated upon.

Figs. 12 and 13 are vertical sections taken along the correspondingly numbered lines on Fig. 6.

Fig. 14 is a view similar to Fig. 13 and showing an increased number of rotary cutter heads provided and these cutter heads so disposed as to take two slices from the kernels, one comprising the cap and the other a second slice under the cap.

Fig. 15 is a perspective view of one of the single tooth pinions which forms a part of the driving connection between the several cutter and scraper fingers and also forms a part of the connection between these fingers and the means for opening these fingers up to accommodate all sizes of ears.

Fig. 16 is a perspective view of one of the scraper fingers and which is also so designed that a cutter head can be attached thereto.

Fig. 17 is a perspective view of one of the cutter heads adapted to be attached to the scraper finger, shown in Fig. 16.

Fig. 18 is a vertical section taken on line 18—18, Fig. 6.

Fig. 19 is a section taken on line 19—19, of Fig. 13 and showing in section the single tooth pinion shown in Fig. 15.

Fig. 20 is a perspective view of the spring adjusting means to which one end of each of the tension springs shown in Fig. 18 can be adjusted.

Fig. 21 is a section taken on line 21—21, Fig. 6 and showing the driving and driven gear for the rotary head.

Fig. 22 is a section taken on line 22—22, Fig. 21 and showing the screw connection between the driven ring gear of the cutter head and the rotary ring thereof.

Similar characters of reference indicate like parts in the several figures of the drawings.

The cream style rotary cutter is shown in the accompanying drawings as mounted upon a pedestal having an oblong top 25 from which a feeding trough 26 projects. The outer end of this feeding trough 26 carries a pinion (not shown) which supports a feed chain 27 of any usual and well known form, the inner end of this feed chain being carried and driven by a pinion 28 and being arranged to discharge the ear of corn between the feeding spur wheels of the machine.

The driving mechanism of the machine comprises a main drive shaft 29 which is suitably journaled in bearing stands 30 carried by the standard 25 and driven in the direction of the arrow shown in Fig. 1 by a suitable driving pulley 31. This main drive shaft 29 carries a large gear 32 which drives the rotary cutter head indicated generally at 33, and also carries a sprocket 34. This sprocket 34 is connected by a chain 35 with a sprocket 36 fast to a shaft 37 supported in bearings 39 on the standard 25. This shaft, as best shown in Fig. 4, has keyed thereto a worm 40 which meshes with a worm gear 41. This worm gear 41 is fast to a shaft 42 which is journaled in bearings 43 on the standard 25. At one end, this shaft 42 carries a pinion 44 which meshes with a relatively large front gear wheel 45 and a relatively small gear wheel 46, as best shown in Fig. 5. The gear wheel 45 is keyed to a hollow shaft or sleeve 47 and is formed at its opposite end to provide a sprocket 48. This sleeve 47 is journaled in a bracket 49 which rises from the standard 25. The sprocket 48 carries a chain 50 which drives a sprocket 51, this sprocket 51 being fast to the shaft 52 which connects with and drives the sprocket 28, as best shown in Fig. 1. It is therefore apparent that a positive drive is provided between the driving pulley 31 and the sprocket feed chain 27. Upon leaving the feed chain 27 the ears of corn are caught between two feed spur wheels 60 and 61 which are driven and held centered with reference to the axis of the rotary driving head by mechanism which preferably is constructed as follows:

The gear wheel 45 meshes with a gear wheel 62 which is keyed to a sleeve or hollow shaft 63, as best shown in Figs. 2 and 5, and this sleeve is journaled in the bracket 49 which also carries the sleeve 47 of the gear 45. Within the sleeve 47 is arranged the shaft 64 and within the sleeve 63 is journaled a similar shaft 65. These shafts and sleeves are suitably held against displacement by collars and adjacent the gears 45 and 42 the shafts 64 and 65 are each pinned to one element 66 of a universal 67. Each of these universal elements carries a second pin 68 which projects radially outward therefrom and is adapted to be engaged by a pin 69 on the corresponding gear 45 or 62. These pins 68 and 69 form the driving connection by which power is transmitted to the universals 67. The other element 70 of each of the universals 67 connects with a shaft 71 which is journaled in vertically movable bearing blocks 72. These bearing blocks 72 are mounted in upper and lower slideways 73 provided in a bracket 74 which is suitably bolted to the pedestal 25 and are held against lateral displacement by plates 75 which are bolted to the sides of this bracket. The shafts 71 extend through the vertically movable bearing blocks 72 and bracket 74 and at their front ends carry the upper and lower feeding spur wheels 60 and 61, as best shown in Fig. 2. The bearing blocks 72 are pressed toward one another by leaf springs 76, one end of each of these springs 76 being secured to the bracket 49 and their free ends bearing against the corresponding sides of arms 77 which are secured to the bearing blocks 72. The free ends of the arms 77 of the upper and lower bearing blocks 72 are connected together by a pair of toggle links 78 and at their center these toggle links 78 are pivotally connected to a bearing block 79 which slides on a stub shaft 80 which is rigid with and projects outwardly from the standard 74.

It is therefore apparent that as the gears 45 and 62 turn, through the pins 68 and 69, the universal joints 67 are also turned and the shafts 71 rotated, thereby rotating the feeding spur wheels 60 and 61. As an ear of corn enters between the spur wheels 60 and 61 these spur wheels open up, the bearing blocks 72 moving outwardly against the resistance of the leaf springs 76 and the shafts 71 turning about their universal joints 67. However, each of the spur wheels 60 and 61 is caused to move an equal distance from the center of the axis of travel of the ears by the toggle linkage 78 which, through the sliding block 79 compels the bearing 72 to move in unison an equal distance away from the center of the stub shaft 80.

The ears of corn are discharged from the machine by a pair of spur wheels 60a and 61a which are arranged at the discharge end of the rotary cutter head indicated generally at 33 and are driven and held equidistant from the center of travel of the ears of corn in substantially the same manner as the feeding spur wheels 60 and 61. For this purpose the gear wheel 46 (Fig. 5) meshes with a similar sized gear wheel 85, both of these gears 46 and 85 being fixed to the shafts 64a and 65a and journaled in a bracket 49a. These shafts 64a and 65a connect with the driven spur wheels 61a and 60a in the same manner that the shafts 64 and 65 connect with the feeding spur wheels 61 and 60 and these discharge spur wheels 60a and 61a are uniformly held at an equal distance from the center of the line of travel of the ears by a toggle linkage similar to the toggle linkage 78 provided for the feeding spur wheels 60 and 61. A separate description of this mechanism is therefore deemed unnecessary and the corresponding parts of the discharge spur wheel driving and equalizing mechanism are given the same reference numerals as it is described in detail with reference to the feeding spur wheels and are distinguished therefrom by the sub-letter "a".

It will be noted that the pair of gear wheels 46 and 85, as best shown in Fig. 5, are smaller than the corresponding gear wheels 45 and 62 which drive the feeding spur wheels. This is purposely done so that the discharge action of the discharge spur wheels 60a and 61a is faster than the feeding action of the feeding spur wheels. It will be noted upon reference to Fig. 1 that the ear of corn being operated upon is simultaneously engaged by both the feeding and discharging pairs of spur wheels. Since the discharging pair of spur wheels 60a and 61a are driven faster than the feeding spur wheels 60 and 61 it is apparent that the discharge spur wheels and the gears 46 and 85 (Fig. 5) will run ahead of the feeding spur wheels 60 and 61 and their gears 45 and 62. When this occurs the pins 69 on the gear wheels 45 and 62 will be withdrawn and advanced away from the pins 69 on the universal elements 66. As soon as the butt end of the ear of corn escapes from the feeding spur wheels 60 and 61 these feeding spur wheels will stop until the pins 69 again catch up to and engage the pins 68 and again establish a drive for the feeding spur wheels 60 and 61. By this time the ear of corn being operated on has been discharged from the machine, all parts of the rotary cutter mechanism have returned to their normal starting position and the mechanism is again in condition to receive the next succeeding ear of corn. The provision of this lag between the discharge of the cob and the feeding of the next succeeding ear is essential to the proper operation of the machine and the proper functioning of the gaging elements.

Between the feeding spur wheels 60 and 61 and the discharging spur wheels 60a and 61a is arranged the rotary cutter mechanism 33. The ear of corn to be operated upon first passes through a circular opening 90 in a stationary disk 91 which is secured by screws 92 to a U-shaped supporting plate 93, this U-shaped supporting plate rising from and being suitably secured by bolts 94 to the standard 25. The face of the feeding side of the disk 91 is provided with an annular groove 95 in which is rotatably mounted a ring 96. This ring carries an upright arm 97 to the upper end of which is secured a tension spring 98, the other end of this tension spring 98 being anchored to a post 99 which rises from the standard 25. The ring 96 also carries a plurality of forwardly projecting spaced pins 100, four being shown.

The ring 96 is held in its groove 95 by four fingers 101 which, as best shown in Fig. 8, are flat and are provided intermediate their ends with holes 102. These fingers 101 are secured to the stationary ring 91 by screws 103 which pass through the holes 102. Each of the fingers 101 is provided with jaws 104 which engage a corresponding pin 100 so that as each finger 101 is moved the movable ring 96 is caused to rotate in its groove 95. Since all of the screws 103 are arranged equidistant around the stationary ring 91 it is apparent that the movement of any one finger 101 will cause a corresponding movement of all of the other fingers 101 and that thereby the fingers necessarily move toward and from the axis of travel of the ears of corn in unison. The free end of each of the flat fingers 101 is recessed as indicated at 105 and is provided with a screw hole 106. In this recess 105 is fitted the flange 107 of a corrugated head 108, the corrugations extending lengthwise of the ear of corn presented to the heads and being adapted to engage the ear and being moved outwardly thereby. Each of the heads 108 projects through the opening 90 of the stationary ring 91 and the outer face 109 of each of the heads 108 is rounded, as indicated in Fig. 12, so that the outer surfaces 109 of the several heads 108 form a substantially cylindrical bearing surface for a purpose which will presently appear.

It is sometimes desirable, especially with relatively hard and matured corn, to slit the kernels before the ears enter the rotary cutters. This can obviously be accomplished by mounting cutter blades 110 in the corrugations of the heads 108, these cutter blades being thereby relatively closely spaced and slitting the kernels of the passing ears as the ear forces the heads 108 and fingers 110 outwardly to accommodate its size. This adaptation of the invention is illustrated in Figs. 10 and 11. In each form, however, the ear in passing the fingers 101 engages the heads 108 and opens them up to a size determined by the diameter of that portion of the ear engaged by these elements. This movement of the fingers 101 is then transmitted to open the rotary cutter and scraper fingers as hereinafter more fully described.

The rotary cutter mechanism is rotated at a relatively high rate of speed by the large gear wheel 32 on the main drive shaft 29, the machine shown being designed to operate at a pulley speed of 1800 R. P. M. The drive shaft gear 32 drives an equal sized ring gear 120 which has a circular opening 121 at its center for the passage of the ears of corn therethrough. This ring gear 120 is provided with a spacing flange 122 which bears against a rotating disk 123, this gear and ring being connected to rotate in unison by a plurality of connecting screws 124, as best shown in Figs. 21 and 22. The flange 122 provides an annular chamber 125 between the ring gear 120 and the rotating disk 123 and the inner end of this chamber is preferably closed by a flange 126 which forms one wall of the passageway through the rotating disk and gear. The rotating disk 123 is journaled in a stationary rim 127 which is suitably mounted on the standard 25 and is held against this rim 127 by a circular retaining plate 128.

The hubs 130 of a plurality of single-tooth pinions 131 are journaled in the rotating disk 123, these being arranged in spaced annular arrangement around the disk, six being shown. The tooth 132 of each of these single-tooth pinions is arranged in the chamber 125 between the ring gear 120 and its rotating disk 123 and the rear end 133 of each of the single-tooth pinions 131 is reduced and journaled in the ring gear 120. The front end of each of the single-tooth pinions, as best shown in Figs. 15 and 19, is also reduced as indicated at 134 and is provided with a threaded opening 135. An arm 136 fits over the reduced front end 134 of each of the single-tooth pinions 131 and is rigidly connected thereto by a screw 137 which forces the arm into rigid frictional engagement with the hub 130 of the single-tooth pinion, as best shown in Fig. 19. The outer or free end of each of the six scraper and/or cutter arms 136 is hook shaped, as best shown in Fig. 16, the end 138 of the hook shaped part forming a scraper end which is adapted to ride along the decapped kernels of corn and scrape the soft interior portions therefrom. Each of the six arms 136 is also adapted to be made into a cutter or decapper by the mounting of a suitable cutter head thereon. For this purpose the hook shaped outer end of each of the arms 136 is provided with a channel 139 on its front face, this channel extending substantially radial to the passing ears of corn. In the center of this channel a threaded opening 140 is provided in each cutter arm and each of these channels is adapted to receive the flat base 141 of a cutter head 142. The flat base 141 of the cutter head 142 is provided with an elongated slot 143 which receives the shank of the screw 144 which screws into the threaded opening 140 of the arm 136 and holds the base 141 of the cutter head 142 in the slot 140. The blade 145 of each cutter head 142 extends at right angles to and forward from the base 141 and the edge 146 of the blade 145 extends at a sharp angle to the base 141 so as to provide a shear cut in decapping the kernels. It is therefore apparent that each of the arms 136 can be used either as a scraper or both as a cutter or scraper by mounting or failing to mount a cutter head 142 thereon. In Fig. 13 alternate arms 136 are provided with cutter heads 142. It is also apparent that the distance, radially outward, of the cutting edge 146 from the end of the hook shaped scraper 138 determines the depth of the cut. Since the scraper is arranged in rear of its cutter head it is apparent that the depth of the cut, i. e. the amount of cap taken off, is gaged from the cob. Consequently, the cutters can never dig into the cob and contaminate the product with pieces of cob. It is also apparent that by the provision of the elongated slot 143 in the cutter head that a substantial range of adjustment is provided for the cutters and that these cutters can be adjusted so as to take two slices from the kernels. For example, in operating on very large and tough kerneled corn it would be undesirable to cut one large cap because the caps in the product would be too large for cream style corn of first quality. When this condition is encountered all the arms 136 can be provided with cutter heads 142, as shown in Fig. 14 and, as also shown in this figure, the cutter heads 142 on alternate arms are arranged a greater distance from the scraper ends of their arms than the others are. By this means two slices will be taken from the kernels, the first slice comprising the cap and being taken by those alternate cutters which are spaced a short distance from their scraper ends and the second slice being a ring shaped slice which is taken by the other cutters. When corn of this character is being operated upon it is, of course, desirable to also employ the form of head shown in Figs. 10 and 11 on the arms 101 so that the caps of the kernels are additionally severed by the knives 110.

All of the arms 136 are caused to operate substantially in unison although those of the arms which function exclusively as scraper arms (the alternate arms unprovided with cutter heads, Fig. 13) are afforded a limited amount of free movement to follow the irregularities of the corn and to scrape off all of the useable material from the cob. In other words, as any one of the arms 136 is moved outwardly or inwardly all of the other arms 136 are moved correspondingly in the manner of a camera shutter but those of the arms 136 which are used only as scrapers have a certain amount of free movement to follow irregularities in the cob.

For this purpose, as best shown in Fig. 18, the teeth 132 of each of the single-tooth pinions 131, which are fast to the corresponding arms 136, projects inwardly and engages a notch in a ring 150, this ring being rotatably mounted on the rearwardly projecting flange 126 and is confined within the chamber 125. Of the notches in the ring 150, the alternate notches 151 are designed for use with the cutters and the other notches 151a are designed for use with the scrapers. As shown in Fig. 13 the alternate arms 136 are provided with cutter heads 142 and the notches 151 associated with these arms are closely fitted to the teeth 132 of the corresponding single-tooth pinions 131. On the other hand, those notches 151a, associated with those alternate arms 136 used solely as scrapers, are wider and permit a limited amount of play over the teeth 132 of the corresponding single-tooth pinions 131. By this means it is apparent that all of the alternate arms 136 which are employed as cutters are positively caused to move inwardly and outwardly in unison, whereas the alternate arms 136 which are used solely as scrapers have a limited amount of play which permits them to adapt themselves to irregularities in the cob.

The rotary cutter head is designed to operate at a speed of 1800 R. P. M. and it is apparent that adjustable spring means must be provided to oppose the centrifugal forces imposed upon the arms 136 and to insure their firm contact with the ear of corn. For this purpose, as best shown in Fig. 18, the single-tooth pinions 131 associated with the alternate arms 136 which function wholly as scrapers, are provided with radially extending pins 153 which are connected to tension springs 154. In addition the rotary ring 150 is provided with a plurality of spaced radially projecting pins 155, three being shown, and these are connected to tension springs 156. All of the pins and springs are arranged within the chamber 125. The free end of each of the springs 154 and 156 is anchored to a tension adjusting device 157 which is shown in perspective in Fig. 20 and in section in Fig. 18. Each of these tension devices 157 is in the form of a pin which extends across the chamber 125 and at its front end is journaled in the rotating disk 123. The rear end is threaded and extends through an opening provided in the ring gear 120 and is slotted as indicated at 158 so that it can be turned. Each of these pins is formed with an annular shoulder 159 which bears against the front or inner face of the ring gear 120 and is provided with a small hook shaped arm 160 on which the end of the corresponding spring 154 or 156 is caught. Lock nuts 161 are provided for holding these pins in their adjusted positions. It is apparent that each of the six pins 157 shown, can be turned to impose the requisite degree of tension on the corresponding springs 154 or 156 and after the adjusted tension is obtained the lock nuts 161 can be tightened down to hold this adjustment.

It is apparent that some means must be provided for initially opening up the arms 136 in accordance with the size of the ear to be operated upon. Thus, if a small ear is passing through, the arms 136 will be opened up to only a limited extent whereas if a large ear of corn is passing through it will be opened up to a greater extent. This opening up of the arms 136 should be less than to the cutting line desired so that the arms 136 gage their own depth of cut and so that this is not done by the initial opening up means. This initial opening up of the arms of the scraper and/or cutter arms 136 is effected through motion derived from the arms 101 which are carried by the stationary disk 91. For this purpose, as previously explained, the heads 108 carried by these arms 101 extend rearwardly through aperture 99 in the plate 91 and this extended part of each of the heads 107 is rounded so that these heads jointly form a substantially cylindrical bearing surface 109 as indicated in Fig. 12. This bearing surface 109 is engaged by the outer ends of three arms 165. These arms are fixedly secured to short shafts 166, which, as best shown in Fig. 6, are journaled in collars 167. One end of each of these collars is threaded and screws into a hole provided in the rotating disk 123 and this collar is also provided with two annular flanges which act as spacers to maintain the arms 165 in spaced relation to the rotating disk 123 which carries them and in proper engagement with the curving surfaces 109 of the heads 108. The shafts 166 extend within the chamber 125. To the end of each of the shafts 166, within the chamber 125, a single-tooth pinion 168 is pinned, the tooth of this pinion meshing with an opening 169 provided in the loose ring 150.

It is therefore apparent that as a large ear of corn enters the orifice 90 in the fixed ring 91 it engages the heads 109 and moves these heads and their supporting arms a corresponding degree. The outward movement of these heads 108 (Fig. 12) moves the rotating arms 165 outwardly thereby turning their shafts 106 and single-tooth pinions 168 (Fig. 18) and shifting the ring 150 correspondingly. This shifting of the ring causes the ring to move the other single-tooth pinions 131 and since these latter single-tooth pinions are fixedly secured to the cutter and scraper arms 136 (Fig. 13) the cutter and scraper arms, together with their operating end, will open up to exactly the proper size to receive the ear. It is obvious that the closer the means for opening up the cutter and scraper arms are to the cutting and scraping means themselves, the more accurate will be the operation of the device. The present invention arranges the heads 108, arms 165 and cutter and/or scraper arms 136 in such close relation that for all practical purposes the cutter and scraper arms are opened up to exactly as desired for each passing ear, this opening up movement being less, however, than is necessary to bring the cutting edges fully out to the line along which the cut is to be made.

Thus the screws 137 (Fig. 13) of the cutter arms 136 are adjusted so that the cutting edges on these arms are within the cutting line after the opening up arms 165 have moved these cutting arms 136 out to the full extent as determined by the size of the passing ear. By this means when the cob strikes the scrapers 138 the cutting and scraping arms 136 will be opened up further. This further movement insures two things: First, the gaging of the depth of the cut is done exclusively from the cob by the scrapers and is not in any way influenced by the initial opening up means, and, second, the opening up arms 165 (Fig. 12), after the scrapers 138 have engaged, are moved out of contact with the heads 108. This eliminates the frictional rotary contact between these parts while the ear is being scraped and not only reduces the noise but also reduces the wear between the arms 165 and the heads 108. The purpose of providing means for initially opening up the cutter knives is to allow the entering of large ears and not to set or determine the depth of the cut, this being determined from the cob line and the distance, radially, of the cutting edges from the scraping edges of the scraper. By providing a definite ratio between the operation of the opening up arms 165 and the cutter arms 136, this ratio being such, say, that the cutter arms 136 are never opened up a distance greater than one-sixteenth of an inch from the cutting line, the depth of the cut is always determined by the cob line and at the same time, during the cutting operation, the arms 165 (Fig. 12) are drawn out of engagement from the relatively stationary heads 108 and there is no undesirable noisy and frictional contact between these parts. There is a further advantage in providing this ratio in that it permits the return of the arms 101 and the heads 108 (Fig. 7) to their closed position after the ear has passed beyond the heads 108, wholly independently of the other parts of the opening up mechanism. By this means the heads 108 contract the moment the ear passes and are in position to receive the next ear, whereas the ear being operated on is required to actually pass the cutting and scraping arms before these arms 136 and the opening up arms 165 return to their normal contracted positions.

The parts of the machine which require the most frequent replacement are, of course, the cutter heads on the arms 136, as shown in Fig. 13. In order to get at these cutter heads conveniently all that is necessary is to remove the three screws 92 (Fig. 7) which hold the stationary plate 91 in position in front of these knives. By so doing the stationary plate 91 can be removed, the rotary cutter heads 142 sharpened or replaced and the stationary plate 91 and its screws 92 thereafter conveniently replaced.

Operation

With power applied to the driving pulley the operation of producing cream style corn from a previously husked ear will be as follows:

A succession of ears are placed tip first in the feeding trough 26. These are engaged by the feeding chain and propelled toward the spur wheels 60 and 61. This feed chain is driven (Fig. 1) from the pulley 31, shaft 29, sprocket 34, chain 35, sprocket 36 (Fig. 4), shaft 37, worm 40, worm wheel 41, shaft 42 (Fig. 5), gears 44 and 45, sleeve 47 (Fig. 2), sprocket 48, chain 55 (Fig. 1), sprocket 51, shaft 52 and feed chain sprocket 28.

When the tip of the ear being fed enters between the feeding spur wheels 60 and 61 it forces these spur wheels apart, the shafts 71 carrying these spur wheels pivoting about the universals 67 (Fig. 2). In so moving apart, the bearing blocks 72 ride up in their slideways 73 against the resistance of the long leaf springs 76, the tension of which is adjusted by the yoke at their rear ends. The spur wheels hold the ear of corn in centered relation to the apparatus by the toggle joint arrangement shown in Fig. 2. As there shown, the arms 77 which project rearwardly from the bearing blocks 72 connect with the ends of a pair of toggle links 78 and the center pivot of these toggle links 78 connect with a slide 79 which works on a pin 80 which projects outwardly from the standard 74 supporting the bearing blocks. It is apparent that by this arrangement the movement of the two spur wheels 60 and 61 will necessarily be uniform toward and from their common center.

The driving universals 70 for the spur wheels 60 and 61 are continuously rotated from the continuously rotating sleeve 47 (Fig. 2) and gear 45 thereon. This gear 45 has a pin 69 which meshes with a pin 68 on the universal. This gear 45 also meshes with another gear 62 also carrying a driving pin 69 which meshes with the driven pin 68 on the upper universal 67.

The driving spur wheels 60 and 61 thereby advance the ear in centered relation into the aperture 90 of the fixed plate 91. The ear thereby engages the heads 108 (Fig. 7) which are removably mounted on the arms 101, these arms 101 being pivoted at 103 to the stationary plate 91. These arms 101 are all caused to move outwardly and inwardly in unison by their jaw and pin connection 100, 104 with the rotating ring 96 mounted in the stationary plate 91. These arms 101 are all held in their retracted position by the tension spring 98 (Fig. 2) connected with the movable ring 96.

The remainder of the apparatus (except for the discharge spur wheels 60a and 61a) is being rotated at 1800 R. P. M. As the ears move the heads 108 on the arms 101 outwardly (Fig. 12) those parts of these heads 108 which project through the opening in the stationary plate 91 force the arms 165 outwardly, these arms 165 being rotated. The outward movement of these arms 165 (Fig. 6) causes the shafts 166 to turn and (Fig. 18) causes the single-tooth pinions connected to these shafts within the chamber 125 to rotate the loose ring 150. The rotation of the loose ring 150 causes the rotation of the other single-tooth pinions 131 against the resistance of the tension springs 154 and 156. The cutter and/or scraper arms 136 (Fig. 13) are secured to the front ends of these single-tooth pinions 131 and are thereby moved outwardly. In this manner the opening movement of the arms 165 (Fig. 12) causes a corresponding movement of the cutter and/or scraper arms 136, these arms acting in much the same manner as a camera shutter. The ear of corn thereupon is fed by the feeding spur wheels 60 and 61 through the opening at the center of the scraper and/or cutter arms 136 and since some of these arms 136 (preferably alternate arms) are provided with cutting heads 142, the cutting edges of the heads sever the caps from the kernels. It is essential that the cutter and/or scraper arms 136 are not opened up fully to the proper cutting line through this opening up device. These arms 136 are so opened up to within, say, one-sixteenth of an inch of the cutting line desired so that the depth of the cut is determined by the scraping ends 138 of the arms 136 which the cob subsequently engages. Thus each ear actually forces the knife and cutter arms 136 a small distance greater than that set by the opening up means, this movement of the arms 136 drawing the arms 165 (Fig. 12) free from the heads 108 and reducing the noise and wear between these elements which would otherwise result. As the corn passes through it is then engaged by the ends 138 of the arms 136 which scrape the soft exposed interior parts of the kernels from the cob. The depth of the cut is determined by the distance of the cutting edges 146 from the scraper ends of the arms 136 so that at no time is there any danger of the machine cutting into the cob, the opening up means being completely inoperative. It will be noted that the large sized notches 151a (Fig. 18) of those alternate arms 136 which act only as scrapers (Fig. 13) and are unprovided with cutting heads 142, afford a limited free movement of these purely scraper arms 136 so that these scraper arms can follow the irregularities of the cob.

The rotating disk 123 which carries the cutter and/or scraper arms 136 and also carries the arms 165 which serve to open up these cutter and/or scraper arms 136, is rotated at 1800 R. P. M. from the main drive shaft 29 (Fig. 1) through the large gear wheel 31 and ring gear 120 which is fixedly connected to the rotating disk 123 by the screws 124. The rotating disk 123 is also journaled in its rotating movement (Fig. 6) by the stationary rim 127 and retaining flange 128.

After being decapped and scraped the ear of corn passes through the aperture (Fig. 6) in the rotating disk 123 and ring gear 120 and engages the discharge spur wheels 60a and 61a which are mounted in the same manner as the driving spur wheels 60 and 61 and are driven through universals 67a similar to the universals 67 provided for the driving spur wheels 60 and 61. These universals are connected to a pair of intermeshing spur wheels 46 and 85 which are continuously rotated from the pinion 44 (Fig. 5). It will be noted that the pair of gears 46 and 48 for the driven spur wheels 60a and 61a is considerably smaller than the corresponding gears 45 and 62 for the driving spur wheels 60 and 61. Therefore when the ear of corn bridges the two sets of spur wheels (Fig. 6) the power is transmitted only through the discharge spur wheels 60a and 61a and the feeding spur wheels 60 and 61 are dragged along by the ear of corn. This is possible since the driving connection for the feeding spur wheels 60 and 61 includes the pair of pins 68 and 69 (Fig. 2) between the gears 45 and 62 and the two universals 67. Since the discharge spur wheels 60a and 61a are being rotated at a higher rate of speed the feeding spur wheels 60 and 61 are dragged along and the pins 68 and 69 are retracted from one another until the butt of the ear passes beyond the feeding spur wheels 60 and 61. Thereupon the feeding spur wheels 60 and 61 will not again start to rotate until the pins 69 have caught up with the pins 68. This provides a lag in the operation of the feeding spur wheels 60 and 61 which prevents another ear of corn from being fed into the machine until the ear of corn being operated upon has been discharged and the parts have all returned to their normal inoperative positions shown.

When it is desired to split the kernels before they are decapped the heads 108 of the arms 101 (Figs. 7 and 9) are substituted by the heads shown in Figs. 10 and 11 which are provided with cutting blades 110, these cutting blades cutting into the ears along longitudinal lines as the ears pass through the orifice 90 in the fixed plate 91.

When it is desired to take two cuts from the kernels, that is, to decap the kernels and thereafter take a second cut from the kernels all of the arms 136, as shown in Fig. 14, are provided with the cutting heads 142 and alternate cutting heads 142 are spaced outwardly a greater distance from the axis of movement of the ears than the others are. It is apparent that this arrangement permits of cutting two slices from very large kerneled ears of corn.

From the foregoing it is apparent that the present invention provides, considering the function which it performs, a very simple, inexpensive and rugged rotary corn cutter for producing cream style corn. The machine also will operate to remove all of the desired parts of the kernels of the corn regardless of the size of the corn or its condition and operates at a high rate of speed, thereby insuring the maximum production. The machine is also easily kept in repair and is easily kept clean and sanitary. The machine also cannot become jammed or clogged under any normal conditions of operation and can be operated by one having comparatively little mechanical skill.

I claim as my invention:

1. In a rotary corn cutter, a rotary head, means for conveying the ears of corn coaxially through said head, means for rotating said head relative to said ears, a plurality of cutter elements movably mounted on said head and adapted to engage and decap the kernels of the passing ears, a plurality of scraper elements movably mounted on said head and adapted to engage and scrape out the soft internal portions of the decapped kernels, means connecting said cutter and scraper elements to move toward and from the axis of travel of said ears substantially in unison and a lost motion connection between said scraper elements and said connecting means whereby a limited free movement is permitted said scraper elements to permit them to follow irregularities in the cob.

2. In a rotary corn cutter, a rotary cutting head, means for conveying the ears of corn coaxially through said head, means for rotating said head relative to said ears, a rotatable notched ring mounted coaxially with said head, a plurality of pinions journaled in said head and meshing with the notches of said ring, a plurality of cutter arms fixedly secured to some of said pinions and being adapted to engage and decap the kernels of the passing ears, and a plurality of scraper arms secured to the other of said pinions and being adapted to engage and scrape out the soft interior portions of the decapped kernels, the teeth of those pinions which carry the scraper arms being loosely received in their notches whereby a limited free movement of said scraper arms is permitted to permit them to follow irregularities in the cob.

3. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element toward and from the axis of travel of said ears and including an arm pivotally supported on the front side of said head and movable toward and from the axis of travel of said ears and means to open said element in accordance with the size of the ear about to be operated on, comprising a plurality of non-rotating jaws mounted to embrace the ear in advance of said rotary head and to be opened in accordance with the size of the ears passing therethrough, said jaws having rounded outer surfaces engaged and traversed by said arm, and cutting blades provided on said jaws, said blades extending longitudinally of the ears of corn and slitting the kernels thereof prior to the operation of said element.

4. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element toward and from the axis of travel of said ears and including an arm pivotally supported on the front side of said head and movable toward and from the axis of travel of said ears and means to open said element in accordance with the size of the ear about to be operated on, comprising a support detachably secured to a stationary part of the machine, a plurality of jaws pivotally mounted on said support and arranged to embrace the ear in advance of said rotary head and to be opened in accordance with the size of the ear passing therethrough, said jaws having rounded outer surfaces engaged and traversed by said arm, the detachability of said support permitting ready access to said rotary head and the operating element carried thereby.

5. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element toward and from the axis of travel of said ears and including an arm pivotally supported on the front side of said head and movable toward and from the axis of travel of said ears and means to open said element in accordance with the size of the ear about to be operated on, comprising a support secured to a stationary part of said machine, a rotatable ring mounted on said support coaxially with the corn, a plurality of fingers pivoted to said support to move toward and from the axis of travel of said ears, a jaw carried by each finger, said jaws being arranged to embrace the ear in advance of said rotary head and to be opened in accordance with the size of the ear passing therethrough and said jaws having rounded outer surfaces engaged and traversed by said arm, and means operatively connecting each of said fingers with said ring whereby they are compelled to open and close in unison.

6. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element toward and from the axis of travel of said ears and including an arm pivotally supported on the front side of said head and movable toward and from the axis of travel of said ears and means to open said element in accordance with the size of the ear about to be operated on, comprising a support secured to a stationary part of said machine, a rotatable ring mounted on said support coaxially with the corn, a plurality of fingers pivoted to said support to move toward and from the axis of travel of said ears, a jaw carried by each finger, said jaws being arranged to embrace the ear in advance of said rotary head and to be opened in accordance with the size of the ear passing therethrough and said jaws having rounded outer surfaces engaged and traversed by said arm, means operatively connecting each of said fingers with said ring whereby they are compelled to open and close in unison, and spring means operatively connected with said ring to urge said fingers inwardly.

7. In a rotary corn cutter, a rotary head, means for conveying the ears of corn coaxially through said head, means for rotating said head relative to said ears, a rotatable notched ring mounted coaxially on said head, a plurality of pinions journalled in said head and meshing with the notches of said ring whereby they are rotated substantially in unison, arms fixedly secured to said pinions and being adapted to engage and remove portions of the kernels of the passing ears, another pinion journalled in said head and meshing with said notched ring, a shaft fixed to said last pinion and projecting forwardly therefrom, an arm mounted on said shaft and movable toward and from the axis of travel of the ears of corn, and means to open said first named arms in accordance with the size of the ear about to be operated upon, comprising a support secured to a stationary part of said machine, a rotatable ring mounted on said support coaxially with the corn, a plurality of fingers pivoted to said support to move toward and from the axis of travel of said ears, a jaw carried by each finger, said jaws being arranged to embrace the ear in advance of said rotary head and to be opened in accordance with the size of the ear passing therethrough and said jaws having rounded outer surfaces engaged and traversed by said last named arm, means operatively connecting each of said fingers with said last named ring whereby they are compelled to open and close in unison and spring means urging all of said fingers and arms toward the axis of travel of said ears.

8. In a rotary corn cutter, a rotary cutting mechanism, a pair of ear feeding spur wheels arranged in advance of said cutting mechanism, a pair of ear discharge spur wheels arranged in rear of said cutting mechanism, said pairs of spur wheels being closely spaced to simultaneously engage an ear of corn, a power source, a positive drive between said power source and said discharge pair of spur wheels, and a drive for rotating said feeding spur wheels at a speed less than said discharge spur wheels including means for disconnecting said feeding spur wheels from their drive to permit said feeding spur wheels to rotate faster than provided through their drive and providing a lag in the operation of said feeding spur wheels after being so rotated faster than provided through their drive.

9. In a rotary corn cutter, a rotary cutting mechanism, a pair of ear feeding spur wheels arranged in advance of said cutting mechanism, a pair of ear discharge spur wheels arranged in rear of said cutting mechanism, said pairs of spur wheels being closely spaced to simultaneously engage an ear of corn, a power source, a positive drive between said power source and said discharge pair of spur wheels, and a drive for rotating said feeding spur wheels at a speed less than said discharge spur wheels and including a pair of sleeves positively rotated in unison from said power source, a pin carried by each sleeve, said pins being arranged off center from the axes of said sleeves, a shaft journalled in each sleeve and operatively connected with each driving spur wheel and a pin projecting laterally from each shaft and arranged in the path of the corresponding first named pin thereby permitting said feeding spur wheels to rotate faster than provided by said sleeves and providing a lag in the operation of said feeding spur wheels after being so rotated faster than provided by said sleeves.

10. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element toward and from the axis of travel of said ears, non-rotating means mounted independently of said head to actuate said last named means to open said element part way to its cutting position, and means engaging the scraped cob for subsequently further opening said element to its proper cutting position.

11. In a high speed rotary corn cutter, a single rotary head rotating about an axis, means for conveying the ears of corn endwise through said head, means for rotating said head relative to said ears, a cutting device pivotally carried by said head and having a cutting edge adapted to pass circumferentially about said ear and sever the kernels, a scraping and gaging device pivotally carried by said head immediately adjacent, lengthwise of the ear, said cutting edge and having a blunt edge which is relatively short and has relatively short contact lengthwise of the ear and adapted to scrape out the remaining portions of the kernels, said cutting and scraping edges being connected to move in unison so that the scraping edge of the scraping device is at all times disposed inside of the cutting line of said cutting device and the depth of the cut thereby determined by the engagement of said scraping device with the cob and whereby said cutting and blunt edges closely follow the undulation of the cob surface while traversing the entire length of the ear.

12. In a high speed rotary corn cutter, a single rotary head rotating about an axis, means for conveying the ears of corn coaxially through said head, means for rotating said head relatively to said ears, an arm pivotally mounted on said head and having an integral blunt end projecting laterally toward the cob so as to act on said ear as a scraper and as a gage, a cutting member adjustably carried on the advance side of said arm immediately adjacent said blunt end and adjustable toward and from the axis of travel of the ears, said last named cutting member being provided with a cutting edge disposed inside of the scraping line of said blunt end and adapted to sever the kernels prior to their being scraped whereby the depth of cut of said cutting member is determined by the engagement of said blunt end with the cob, and means for holding the blunt end of said arm in engagement with the ears in opposition to the centrifugal force of rotation, said blunt end being relatively short and having relatively short contact with the ear lengthwise thereof whereby said cutting edge is at all times gaged from an immediately adjacent portion of the cob while traversing the entire length of the ear.

13. In a rotary corn cutter, a single rotary head rotating on a horizontal axis, comprising a front rotor and a ring fixed to the rear side of said rotor, said elements being formed to provide a revolving housing having an internal annular chamber between said rotor and ring, means for conveying the ears of corn coaxially through said head, means for rotating said head relative to said ears, a plurality of elements pivotally mounted to extend through the front side of said rotor and each carrying an element adapted to engage and remove portions of the kernels of the ears and means arranged within said chamber and connected to said pivotally mounted means for moving said elements toward and from the axis of travel of said ears substantially in unison.

14. In a rotary corn cutter, a single rotary head rotating on a horizontal axis, comprising a front rotor and a ring fixed to the rear side of said rotor, said elements being formed to provide a revolving housing having an internal annular chamber between said rotor and ring, means for conveying the ears of corn coaxially through said head, means for rotating said head relative to said ears, a plurality of elements pivotally mounted to extend through the front side of said rotor and each carrying an element adapted to engage and remove portions of the kernels of the ears, means arranged within said chamber and connected to said pivotally mounted means for moving said elements toward and from the axis of travel of said ears substantially in unison, spring means arranged wholly within said chamber for yieldingly urging said elements toward said ears in opposition to the centrifugal forces imposed thereon, and means adjustable from the exterior of said head for varying the tension of said spring means.

15. In a rotary corn cutter, a rotary head, means for conveying the ears of corn coaxially through said head, means for rotating said head relative to the ears of corn, an element movably mounted on said head and adapted to engage and remove portions of the kernels of the ears, means carried by said head for moving said element away from the axis of travel of said ears and non-rotating means mounted independently of and in advance of said head to actuate said last named means to open said element in accordance with the size of the ear about to be operated on and gage means arranged to engage the cob immediately adjacent said element, lengthwise of the ear, and control the positioning of said element independently of said non-rotating means until the ear of corn has passed thereby.

16. In a rotary corn cutter, a rotary head, means for conveying the ears of corn coaxially through said head, means for rotating said head relative to the ears of corn, an element movably mounted on said head and adapted to engage and remove portions of the kernels of said ears, means carried by said head for moving said element away from the axis of travel of said ears and including an arm pivotally mounted on said head and movable toward and from the axis of travel of said ears and means in advance of said head to initially move said element away from said axis of travel in accordance with the size of the ear about to be operated on comprising a plurality of non-rotating jaws pivotally mounted on a stationary part of the machine and embracing the ear in advance of said rotary head and opened in accordance with the size of the ears passing therethrough, and means for imparting the initial opening movement of said jaws to effect a corresponding outward movement of said arm and scraping and gaging means arranged to engage the cob immediately adjacent said element, lengthwise of the ear, and control the position of said element, independently of said jaws, until the ear of corn has passed thereby.

17. In a high speed rotary corn cutter, a single rotary head rotating about an axis, means for conveying the ears of corn endwise through said head, means for rotating said head relative to said ears, a cutting device pivotally carried by said head and having a cutting edge adapted to pass circumferentially about said ear and sever the kernels, a scraping and gaging device pivotally carried by said head immediately adjacent, lengthwise of the ear, said cutting edge, and having a blunt end which is relatively short and has relatively short contact lengthwise of the ear and adapted to scrape through to the cob, said cutting edge and blunt end being connected to move in unison so that the blunt end of the scraping device is at all times disposed inside of the cutting line of said cutting device and the depth of the cut thereby determined by the engagement of said scraping device with the cob and whereby said cutting edge and blunt end closely follow the undulation of the cob surface while traversing the entire length of the ear.

18. In a high speed rotary corn cutter a single rotary head rotating about an axis, means for conveying the ears of corn coaxially through said head, means for rotating said head relative to said ears, an arm pivotally mounted on said head and having a blunt end projecting laterally toward the cob so as to act on said ear as a scraper and as a gauge, a cutting member carried on the advance side of said arm immediately adjacent said blunt end, said last named cutting member being provided with a cutting edge disposed at all times inside of the scraping line of said blunt end and adapted to sever the kernels prior to their being scraped whereby the depth of cut of said cutting member is determined by the engagement of said blunt end with the cob, and means for holding the blunt end of said arm in engagement with the ears in opposition to the centrifugal force of rotation, said blunt end being relatively short and having relatively short contact with the ear lengthwise thereof whereby said cutting edge is at all times gaged from an immediately adjacent portion of the cob while traversing the entire length of the ear.

HENRY J. WHEELER.